United States Patent [19]
Coker et al.

[11] Patent Number: 5,949,831
[45] Date of Patent: Sep. 7, 1999

[54] METHOD AND APPARATUS FOR DATA DETECTION FOR PRML DATA CHANNELS

[75] Inventors: Jonathan Darrel Coker, Rochester, Minn.; Evangelos S. Eleftheriou, Zurich, Switzerland; Richard Leo Galbraith, Rochester, Minn.; Walter Hirt, Wettswil, Switzerland

[73] Assignee: International Business Machines Corporation, Armonk, N.Y.

[21] Appl. No.: 08/859,983

[22] Filed: May 21, 1997

[51] Int. Cl.⁶ ................................................... H03D 1/00
[52] U.S. Cl. ........................... 375/341; 371/43.6; 360/51
[58] Field of Search .................................... 375/341, 262, 375/263; 360/46, 51, 65; 371/43.6

[56] References Cited

U.S. PATENT DOCUMENTS

| | | | |
|---|---|---|---|
| 4,786,890 | 11/1988 | Marcus et al. | 341/81 |
| 5,196,849 | 3/1993 | Galbraith | 341/59 |
| 5,220,466 | 6/1993 | Coker et al. | 360/46 |
| 5,233,482 | 8/1993 | Galbraith et al. | 360/46 |
| 5,258,940 | 11/1993 | Coker et al. | 364/724.16 |
| 5,268,848 | 12/1993 | Coker et al. | 364/724.19 |
| 5,341,387 | 8/1994 | Nguyen | 375/341 |
| 5,343,340 | 8/1994 | Boutaghou et al. | 360/77.08 |
| 5,426,541 | 6/1995 | Coker et al. | 360/65 |
| 5,442,492 | 8/1995 | Cunningham et al. | 360/46 |
| 5,521,945 | 5/1996 | Knudson | 375/341 |
| 5,619,539 | 4/1997 | Coker et al. | 375/341 |
| 5,689,532 | 11/1997 | Fitzpatrick | 375/341 |

OTHER PUBLICATIONS

U.S. application Ser. No. 08/715,174, filed Sep. 17, 1996, entitled "Noise Predictive Maximum Likelihood (NPML) Detection Methods And Apparatus Based Thereon", by Coker et al.

*Primary Examiner*—Temesghen Ghebretinsae
*Attorney, Agent, or Firm*—Joan Pennington; Matthew J. Bussan

[57] ABSTRACT

A method and apparatus are provided for data detection for a partial-response maximum-likelihood (PRML) data detection channel in a direct access storage device. A class-IV partial response (PR4) signal is applied to a PR4 Viterbi detector to provide a PR4 Viterbi output and is applied to a first matching delay circuit to provide a delayed PR4 signal. The PR4 Viterbi output is subtracted from the delayed PR4 signal and a resulting signal is applied to a first filter having a frequency response of $1/(1-\alpha D^2)$. The filtered output signal is applied to a second filter providing a second filtered output signal. The PR4 Viterbi output is applied to a second matching delay circuit to provide a delayed PR4 Viterbi output signal. The delayed PR4 Viterbi output is corrected responsive to the second filtered output signal. The first filter is an infinite impulse response (IIR) filter and the filtered output signal represents whitened noise and modified PRML error events. The second filter is a matched filter used to identify dominant error events.

20 Claims, 8 Drawing Sheets

METHOD AND APPARATUS FOR DATA DETECTION FOR PRML DATA CHANNELS

FIELD OF THE INVENTION

The present invention relates to methods and apparatus for detecting data, and more particularly to, an advanced sequence data detection method and apparatus for a partial-response maximum-likelihood (PRML) data detection channel in a direct access storage device.

DESCRIPTION OF THE PRIOR ART

Disk drive units often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

A partial-response maximum-likelihood (PRML) detection channel advantageously is used to achieve high data density in writing and reading digital data on the disks. U.S. Pat. No. 4,786,890 discloses a class-IV PRML channel using a run-length limited (RLL) code. The disclosed class-IV partial response channel polynomial equals $(1-D^2)$, where D is a one-bit interval delay operator and $D^2$ is a delay of two-bit interval delay operator and the channel response output waveform is described by taking the input waveform and subtracting from it the same waveform delayed by a two-bit interval. A (0, k=3/k1=5) PRML modulation code is utilized to encode 8 bit binary data into codewords comprised of 9 bit code sequences, where the maximum number k of consecutive zeroes allowed within a code sequence is 3 and the maximum number k1 of consecutive zeroes in the all-even or all-odd sequences is 5. Various improvements have been implemented in PRML detection channels in disk drives.

For example, U.S. Pat. No. 5,196,849 issued Mar. 23, 1993 to Richard L. Galbraith and assigned to the present assignee, discloses apparatus and a method for encoding a predefined number of bits of binary data into codewords having a predefined number of bits for PRML data channels. Rate 8/9 block codes having maximum ones and run length constraints (0,8,12, ∞) and (0,8,6, ∞) are disclosed for providing timing and gain control and reduced susceptibility to misequalization effects in PRML detection channels.

U.S. Pat. No. 5,233,482 to Richard L. Galbraith, Gregory J. Kerwin and Joey M. Poss, issued Aug. 3, 1995 to the present assignee, discloses thermal asperity compensation methods and apparatus for data detection in a PRML data channel. An example of a self equalization adjustment arrangement for data detection in a PRML data channel is provided by U.S. Pat. No. 5,426,541 to Jonathan D. Coker, Richard L. Galbraith et al., issued Jun. 20, 1995 to the present assignee. U.S. Pat. No. 5,619,539 to Jonathan D. Coker et al., issued Apr. 8, 1997 to the present assignee, discloses methods and apparatus for partial-response maximum-likelihood (PRML), extended partial-response maximum-likelihood (EPRML), and Viterbi data detection in a direct access storage device (DASD).

Maximum-likelihood sequence detection is an optimal detection method when the noise at the detector input is additive white gaussian noise (AWGN). Unfortunately, for PRML data channel, the noise at the detector input is usually quite colored in disk drives. Colored noise at the input of a PRML Viterbi sequence detector results in sub-optimal performance and better performance is possible with a different detection method.

SUMMARY OF THE INVENTION

Important objects of the present invention are to provide a method and apparatus for data detection for a partial-response maximum-likelihood (PRML) data detection channel in a direct access storage device; to provide such method and apparatus substantially without negative effects; and to provide such method and apparatus that overcome many of the disadvantages of prior art arrangements.

In brief, a method and apparatus are provided for data detection for a partial-response maximum-likelihood (PRML) data detection channel in a direct access storage device. A class-IV partial response (PR4) signal is applied to a PR4 Viterbi detector to provide a PR4 Viterbi output and is applied to a first matching delay circuit to provide a delayed PR4 signal. The PR4 Viterbi output is subtracted from the delayed PR4 signal and a resulting signal is applied to a first filter having a frequency response of $1/(1-\alpha D^2)$. The filtered output signal is applied to a second filter providing a second filtered output signal. The PR4 Viterbi output is applied to a second matching delay circuit to provide a delayed PR4 Viterbi output signal. The delayed PR4 Viterbi output is corrected responsive to the second filtered output signal.

In accordance with features of the invention, the first filter is an infinite impulse response (IIR) filter and the filtered output signal represents whitened noise and modified PRML error events. The second filter is a matched filter used to identify dominant error events.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
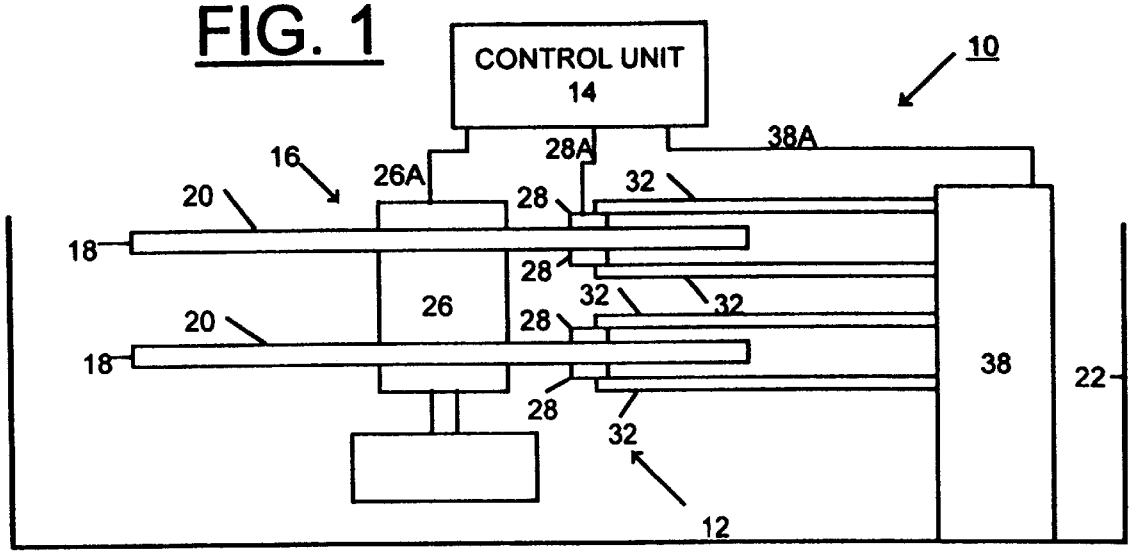
FIG. 1 is a schematic and block diagram of a data storage disk file embodying the present invention.
Figure 2:
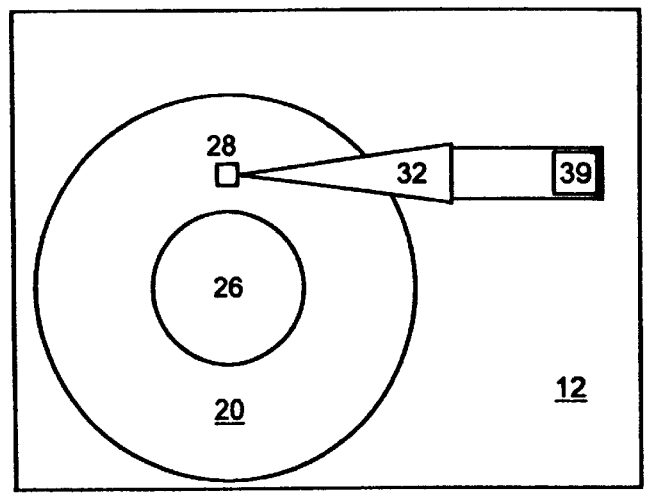
FIG. 2 is a schematic and block diagram showing the accessing mechanism for a single disk surface of the apparatus of FIG. 1.

Having reference now to the drawings, in FIGS. 1 and 2 there is illustrated a data storage disk file generally designated as 10 including a rigid magnetic disk drive unit 12 and an interface control unit generally designated as 14. Unit 12 is illustrated in simplified and diagrammatic form sufficient for an understanding of the present invention. The utility of the present invention is not restricted to the details of a particular drive unit construction.

The disk drive unit 12 includes a stack 16 of disks 18 each having at least one magnetic surface 20. The disks 18 are mounted parallel to one another within a housing 22 for simultaneous rotation on and by an integrated spindle and motor assembly 26. Information on each magnetic disk surface 20 is read from or written to the disk surface 20 by a corresponding transducer head assembly 28 movable in a path having a radial component across the rotating disk surface 20.

Each transducer head assembly 28 is carried by an arm 32. The arms 32 are ganged together for simultaneous pivotal movement by a head drive servo motor 38 including a voice coil 39 cooperating with an internal magnet and core assembly. Drive signals applied to the voice coil 39 cause the arms 32 to move in unison to position the transducer head assemblies 28 in registration with information storage tracks on the disk surfaces 20 where information is written or read.

The disk drive unit 12 is controlled in operation by signals provided by the control unit 14, including motor control signals on line 26A and head position control signals on line 38A. In a typical arrangement, control unit 14 provides an interface with a computer that provides data read and write commands, and data signals are transmitted to or from the transducer head assemblies over corresponding lines 28A, one of which is seen in FIG. 1. Servo position information is recorded on the disk surfaces 20, and the transducer head assemblies 28 read this servo information to provide a servo position signal to the control unit 14. This information is employed by the control unit 14 to provide position control signals on line 38A. The purpose of this position feedback system is to assure accurate and continuous positioning of the transducer head assemblies 28 so that data is written to and read from precise locations on the disk surfaces 20.

Figure 3:
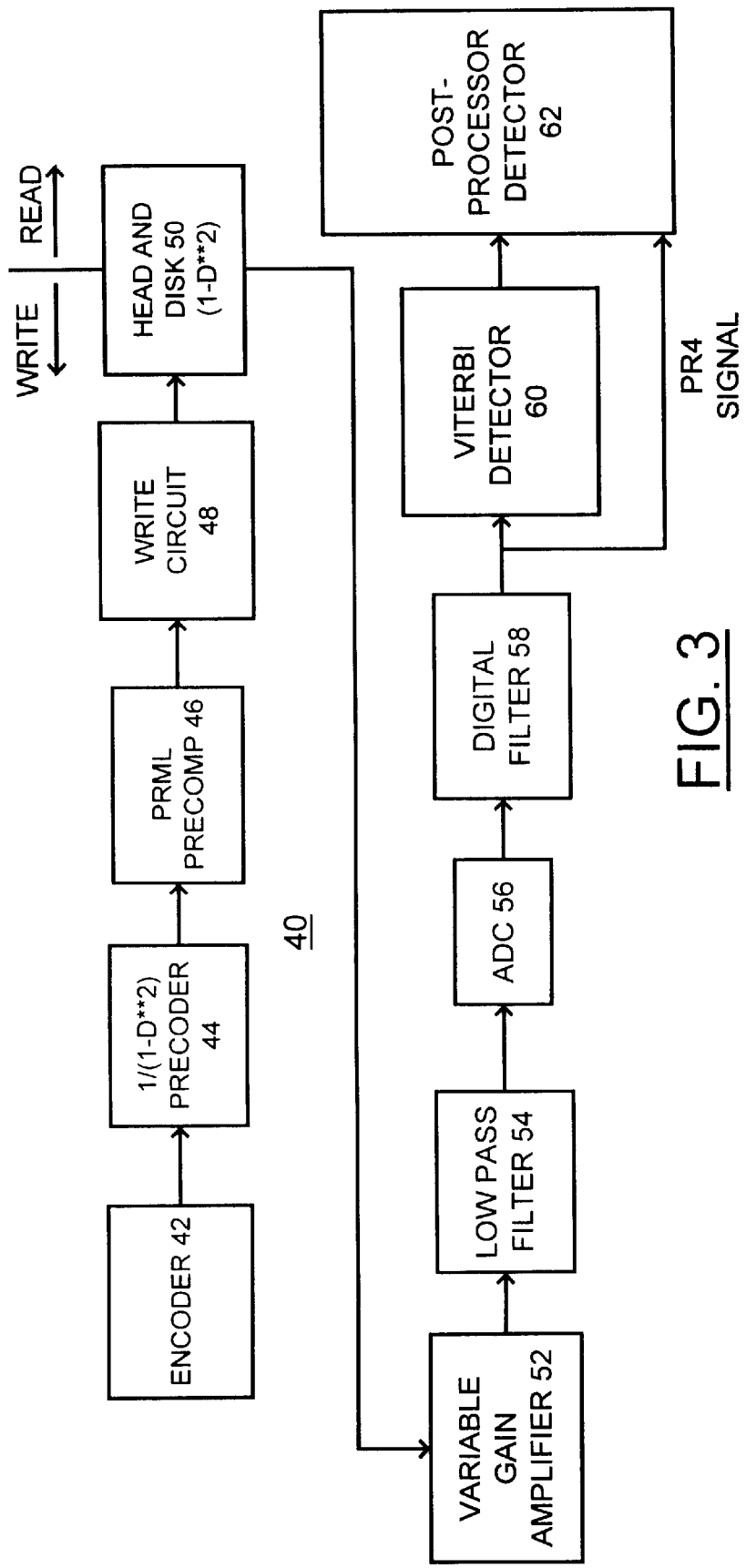
FIG. 3 is a block diagram of a data channel of the data storage disk file of FIG. 1 embodying the present invention.

Referring now to FIG. 3, there is shown a block diagram of a partial-response maximum-likelihood (PRML) channel 40 available in the disk file 10 including an encoder and decoder of the invention. Data to be written is applied to an encoder 42 of the invention for providing a modulation coded output having predefined run length constraints. A precoder 44 follows the encoder 42 described by a $1/(1-D^2)$ operation where D is a unit delay operator. A PRML precomp 46 coupled to the precoder 44 provides a modulated binary pulse signal applied to a write circuit 48 that provides the modulated write current for writing to the disk surface. An analog read signal is obtained at head and disk block 50 described by the $(1-D^2)$ operation. The read signal is applied to a variable gain amplifier (VGA) 52 of the preferred embodiment and the amplified read signal is applied to a lowpass filter 54. The filtered read signal is converted to digital form by an analog-to-digital converter (ADC) 56 that provides, for example, such as 64 possible 6-bit sampled values. The samples of the ADC 56 are applied to a digital filter 58, such as a 10 tap finite impulse response (FIR) digital filter. The filtered signal from the digital filter 58 is a class IV partial response (PR4) signal. The PR4 signal is input to two parallel paths. The filtered PR4 signal from the digital filter 58 is applied to a Viterbi detector 60 and is applied to a post processor detector 62 of the invention. The output of Viterbi detector 60 also is applied to the post processor detector 62 to complete the maximum-likelihood (ML) detection process for data read back.

Figure 6:
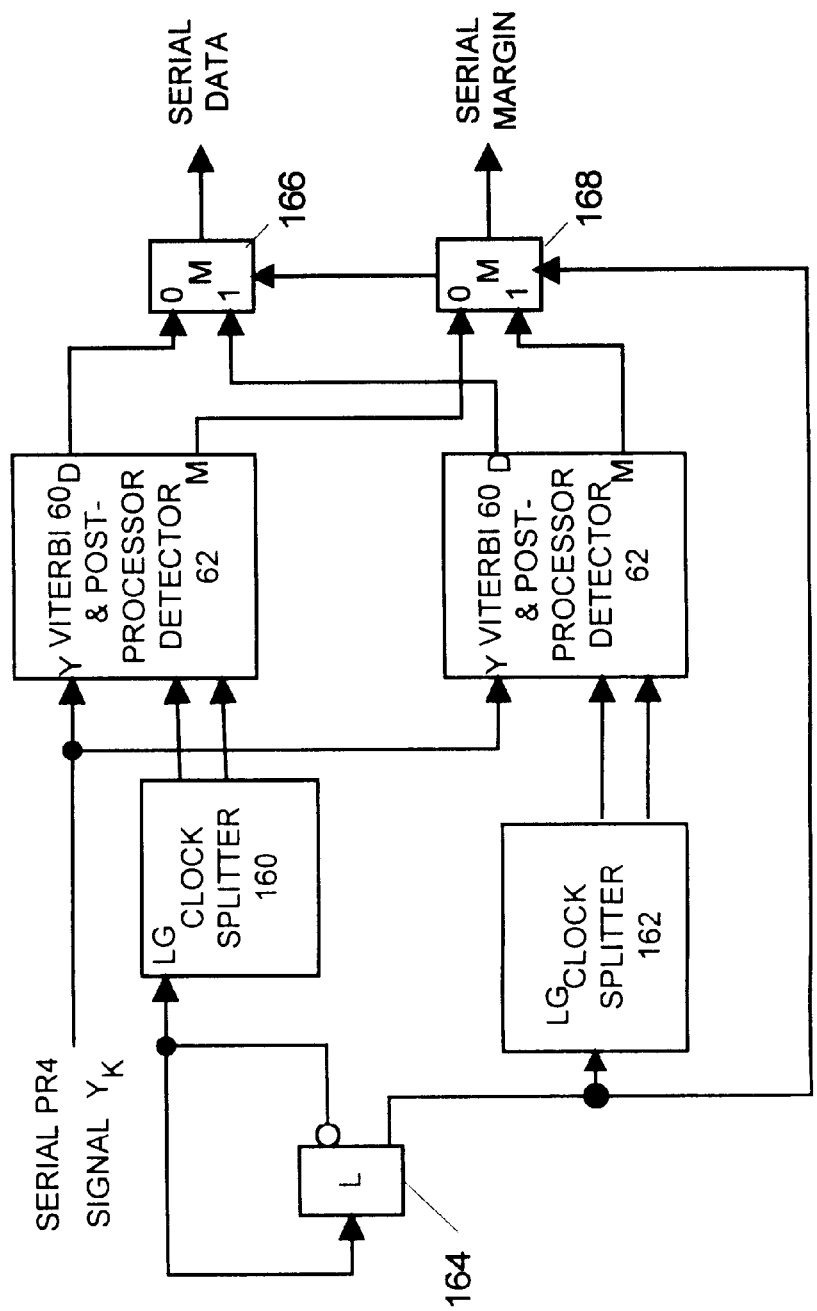
FIG. 6 is a block diagram illustrating dual interleaved detectors of the data channel of FIG. 3 of the present invention.

In accordance with features of the present invention, an advanced sequence detection method uses a sampled PR4 shaped input and provides improved performance, as compared with PRML data detection especially in the presence of transition or media noise and adjacent track interference. Post processor detector 62 advantageously is a dual interleaved implementation, as illustrated in FIG. 6. This allows for very high speed operation. The dual interleaved detector 62, each interleave running at one-half bit rate, is used to implement the detection method of the preferred embodiment. Post processor detector 62 is completely immune to DC offset. DC offset on the ADC samples has no degrading effect on performance. Post processor detector 62 is quite tolerant of MR head asymmetry. Post processor detector 62 has good tolerance to thermal asperities. Post processor detector 62 demonstrates no significant error propagation. Post processor detector 62 is compatible with available (error correcting code) ECC arrangements in the disk file 10.

Advanced DASD data channels, typically have focused on optimizing performance assuming only electronic noise sources. In reality, at least three significant signal components exist which contribute to error rate degradation of the drive system. The composite signal entering the data channel can be represented by the following components: on-track signal intended for detection, adjacent track interference signal, media noise and electronic noise. Media noise is considered to be the random variation in magnetic transition position due to the granularity of the media coating at the time of writing data on the disk. The characteristics of this noise at the detector input are highlighted below.

The ideal PR4 response to a write current transition or step response which is sampled at integer n values can be written as:

$$S(n) = \frac{\sin(\pi n)}{\pi n} + \frac{\sin(\pi(n-1))}{\pi(n-1)}$$

Small delta shift ($\Delta n$) in the placement of a magnetic transition results in a delta response of $$\frac{d}{dn}S(n) \times \Delta n =$$

$$\left( \frac{n\cos(\pi n)\frac{1}{-\pi}\sin(\pi n)}{n^2} + \frac{(n-1)\cos(\pi(n-1))\frac{1}{-\pi}\sin(\pi(n-1))}{(n-1)^2} \right) \times \Delta n$$

For example, a finite impulse response (FIR) filter with the following tap weights can be used to form the sampled response at the detector input due to a media noise source.

| | |
|---|---|
| tap01 = 0.011111 | tap11 = −1.000000 |
| tap02 = −0.013889 | tap12 = −0.500000 |
| tap03 = 0.017857 | tap13 = 0.166667 |
| tap04 = −0.023810 | tap14 = −0.083333 |
| tap05 = 0.033333 | tap15 = 0.050000 |
| tap06 = −0.050000 | tap16 = −0.033333 |
| tap07 = 0.083333 | tap17 = 0.023810 |
| tap08 = −0.166667 | tap18 = −0.017857 |
| tap09 = 0.500000 | tap19 = 0.013889 |
| tap10 = 1.000000 | tap20 = −0.011111 |

Standard PRML data channels exhibit sub-optimal performance since the noise entering the detector is quite colored. The coloring effects are as follow: disk (transition) noise exhibits a $1-D^2$ colored spectrum at the detector input, adjacent track interference exhibits a $1-D^2$ colored spectrum at the detector input and electronic noise exhibits a colored spectrum at the detector input equal to the channel equalization network.

Figure 4:
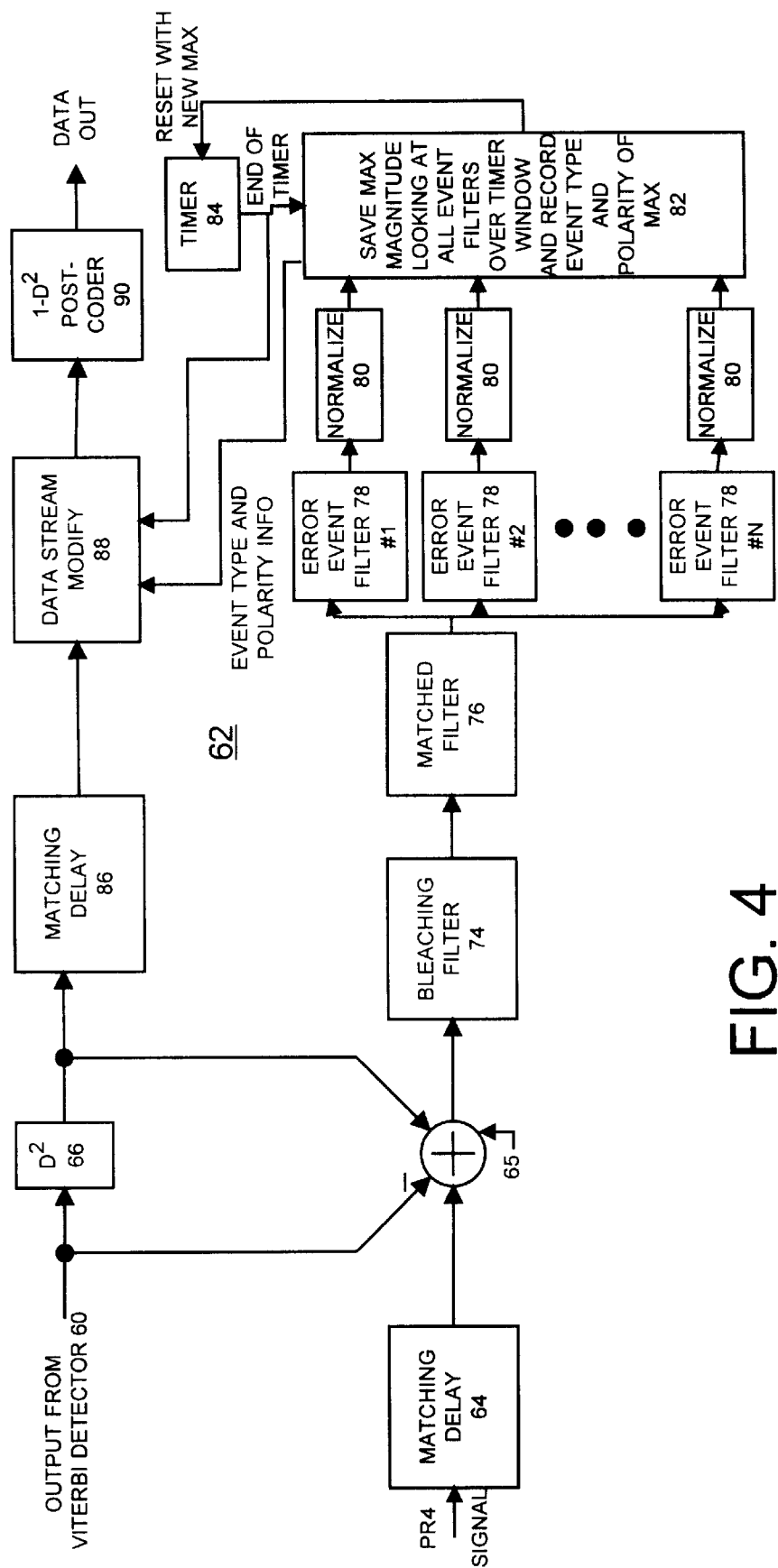
FIG. 4 is a block diagram of data detection apparatus of the data channel of FIG. 3 of the present invention.

Referring now to FIG. 4, there is shown a block diagram functional representation of one interleave of the post processor detector 62 of the invention. The PR4 filtered signal from the digital filter 58 is applied to a matching delay 64 coupled to an adding function 65. The matching delay 64 provides the same time delay as the Viterbi detector 60. The output from the Viterbi detector 60 is applied via a delay function $D^2$ 66 to the adder 65. The post processor detector 62 utilizes a bleaching filter 74 with a frequency response of:

$$\frac{1}{1 - \alpha D^2}$$

The value $\alpha$ is selected non-zero value that is less than 1. The bleaching filter 74 is an infinite impulse response (IIR) bleaching filter. Alternatively, the bleaching filter 74 may have a more general dual interleave frequency response of:

$$\frac{\sum_{i=0}^{\infty} B_i D^{2i}}{\sum_{i=0}^{\infty} \alpha_i D^{2i}}$$

where $B_0$ and $\alpha_0$ typically equal 1 and for non-zero values of i, both $B_i$ and $\alpha_i$ may be non-zero values. The input to the bleaching filter 74 is derived from the delayed PR4 signal output of matching delay 64 minus the Viterbi result or answer of the standard PR4 Viterbi detector 60 coupled by a two bit delay function ($D^2$) 66. The output of the IIR bleaching filter 74 represents whitened noise and modified PRML error events. A matched filter structure 76 and a plurality of predefined error event filters (#1–#N) 78 are used to identify dominant error events. Six exemplary predefined error events occurring at the output of bleaching filter 4 include first +1 0 −1; second +1 0 0 0 −1; third +1 0 0 0 0 0 −1; fourth +1 −1 −1 +1; fifth +1 −1 0 +1 −1; and sixth +1 −1 0 0 −1 +1. At least one error event filter 78 is used with the matched filter 76 to identify a dominant error event.

A normalizer 80 couples each of the error event filters 78 to a compare function 82 that saves a maximum magnitude error event looking at all the event filters 78 over a defined timer window set by a timer 84 and records an event type and polarity of the maximum absolute value error event. The timer 84 is reset with a new maximum magnitude error event. An end of timer is applied to the compare function 82 and a modify gating 88. The recorded event type and polarity information from the compare function 82 is applied to the modify gating 88. The modify gating is used to correct the detected data stream before being applied to a $1-D^2$ postcoder 90 and leaving the post processor decoder 62.

Figure 4A:
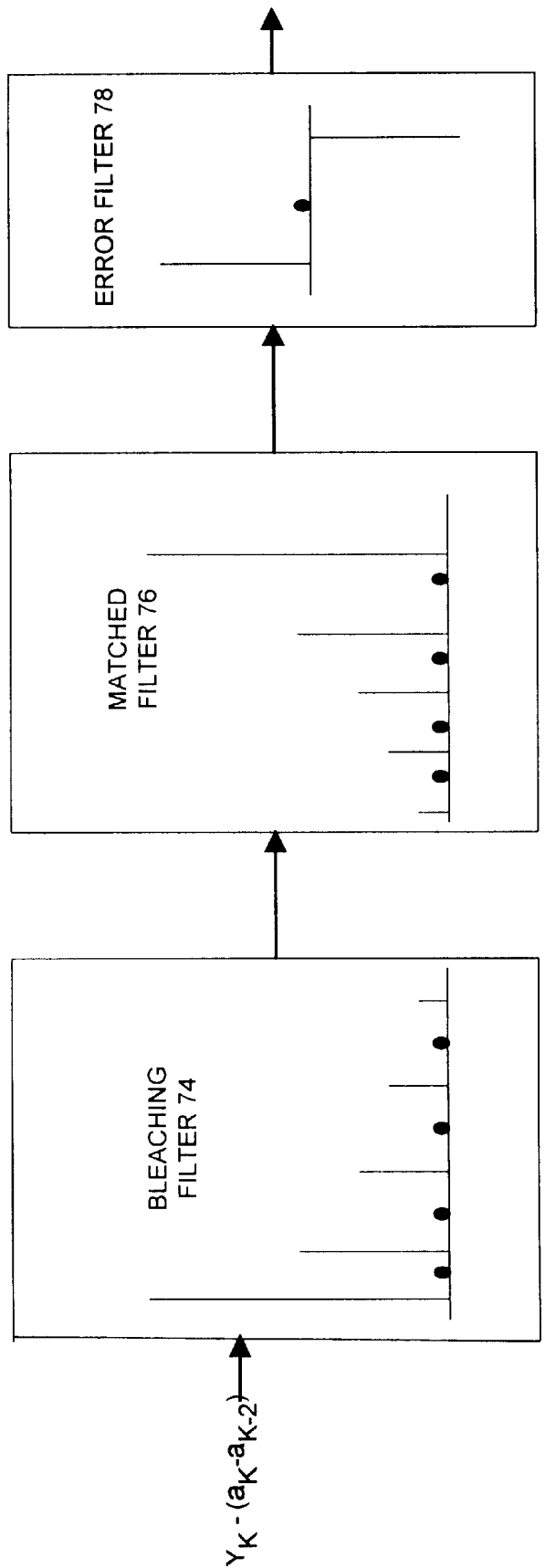
FIG. 4A is an exemplary functional diagram illustrating operation of filters within the detector of FIG. 4.

Referring to FIG. 4A, a time domain representation is provided to illustrate the operation of the post processor decoder 62. The PR4 signal at time K represented by $Y_K$ minus the output of the PR4 Viterbi detector 60 represented by ($a_K - a_{K-2}$) is applied to the IIR bleaching filter 74 having a frequency response of $1/(1-\alpha D^2)$ to provide a filtered signal. As illustrated in FIG. 4A, $\alpha$ is equal to 0.5. The filtered signal output of the bleaching filter 74 representing whitened noise and modified PRML error events is applied to the matched filter 76 being reversed in time to the IIR bleaching filter 74. A two bit error filter 78 is illustrated for identifying two bits in error responsive to the output of the matched filter 76.

Figure 5A:
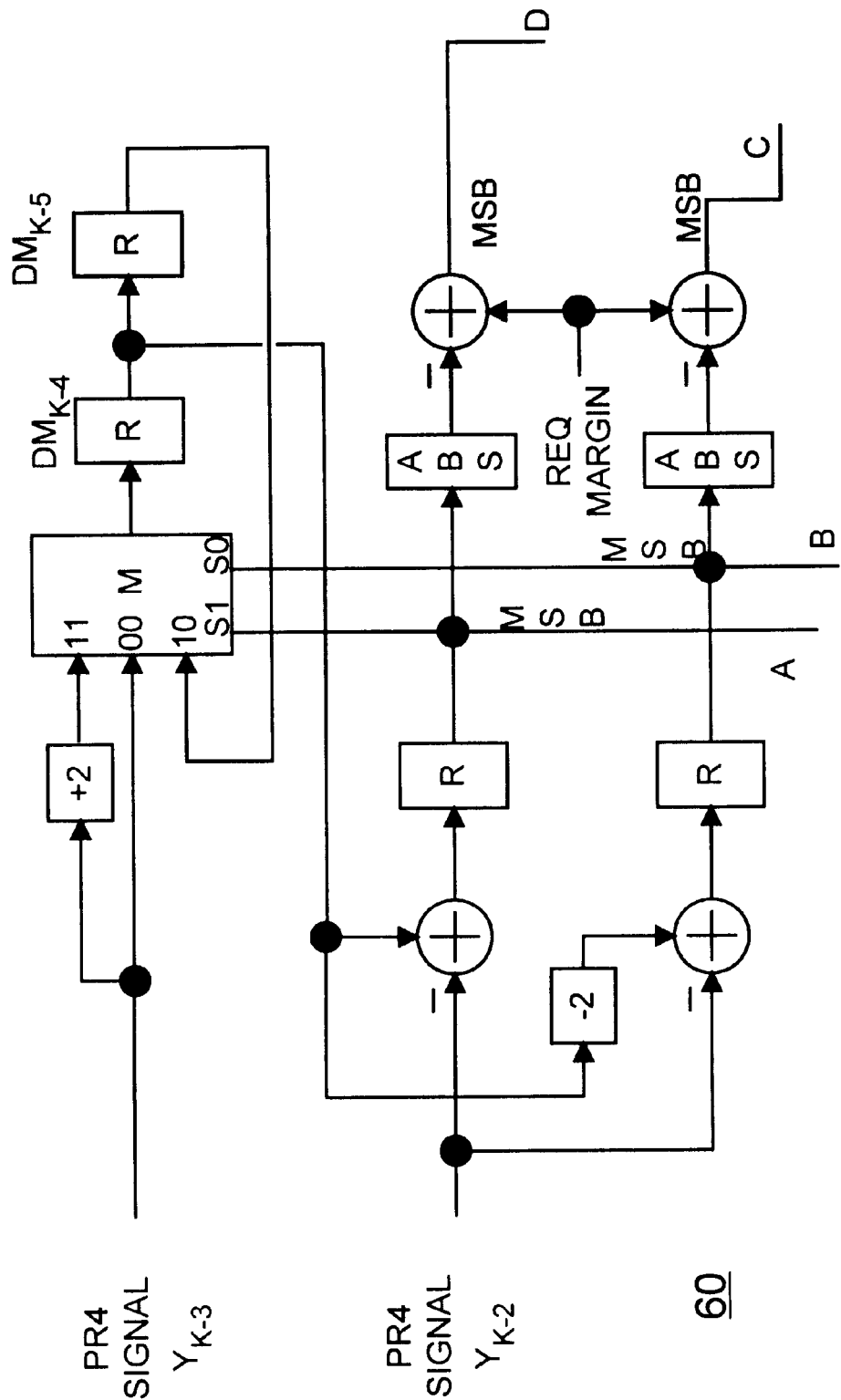
FIGS. 5A, 5B, and 5C together provide an exemplary schematic diagram illustrating the Viterbi detector of FIG. 3 and the data detection apparatus of FIG. 4 of the present invention.
Figure 5B:
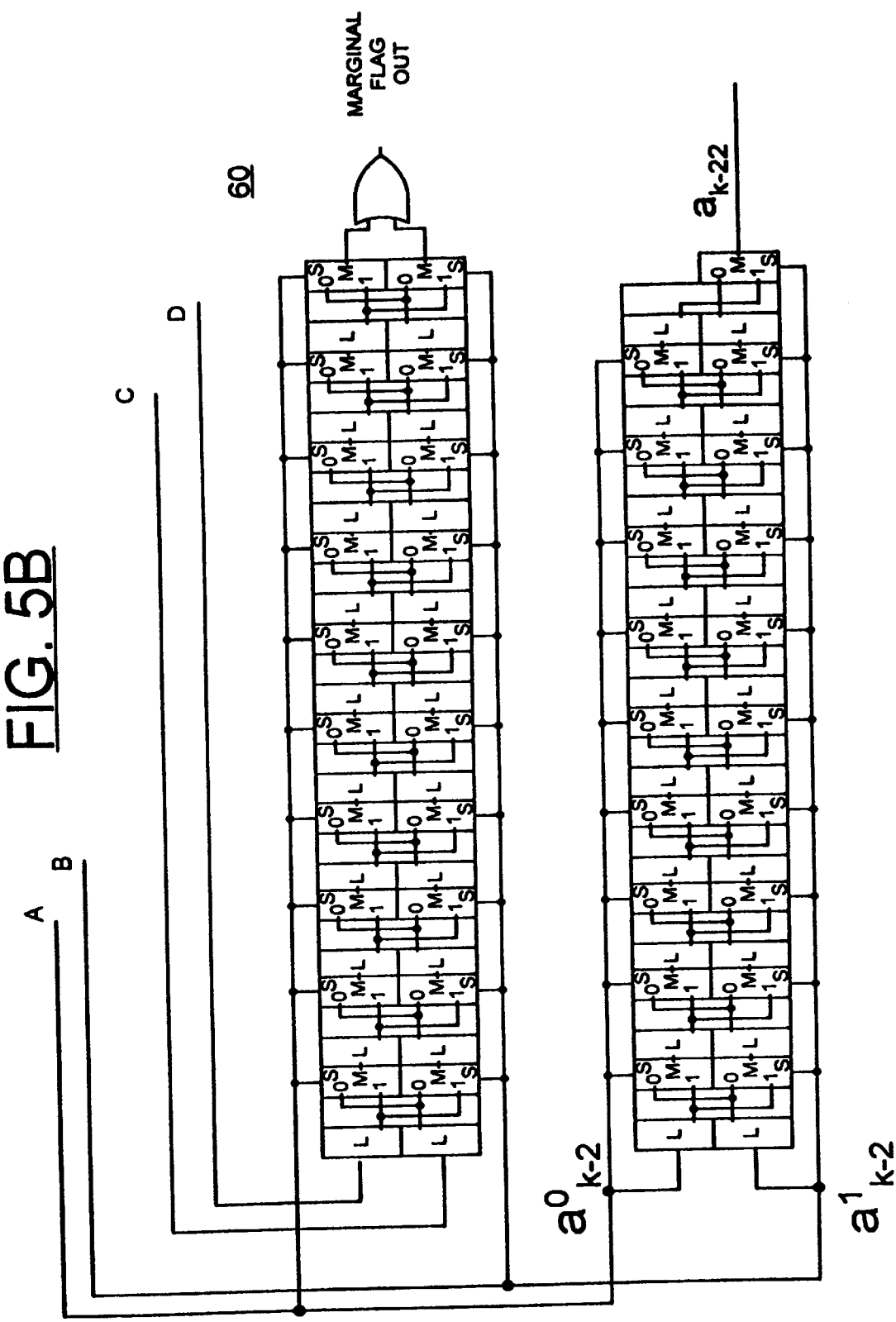
Figure 5C:
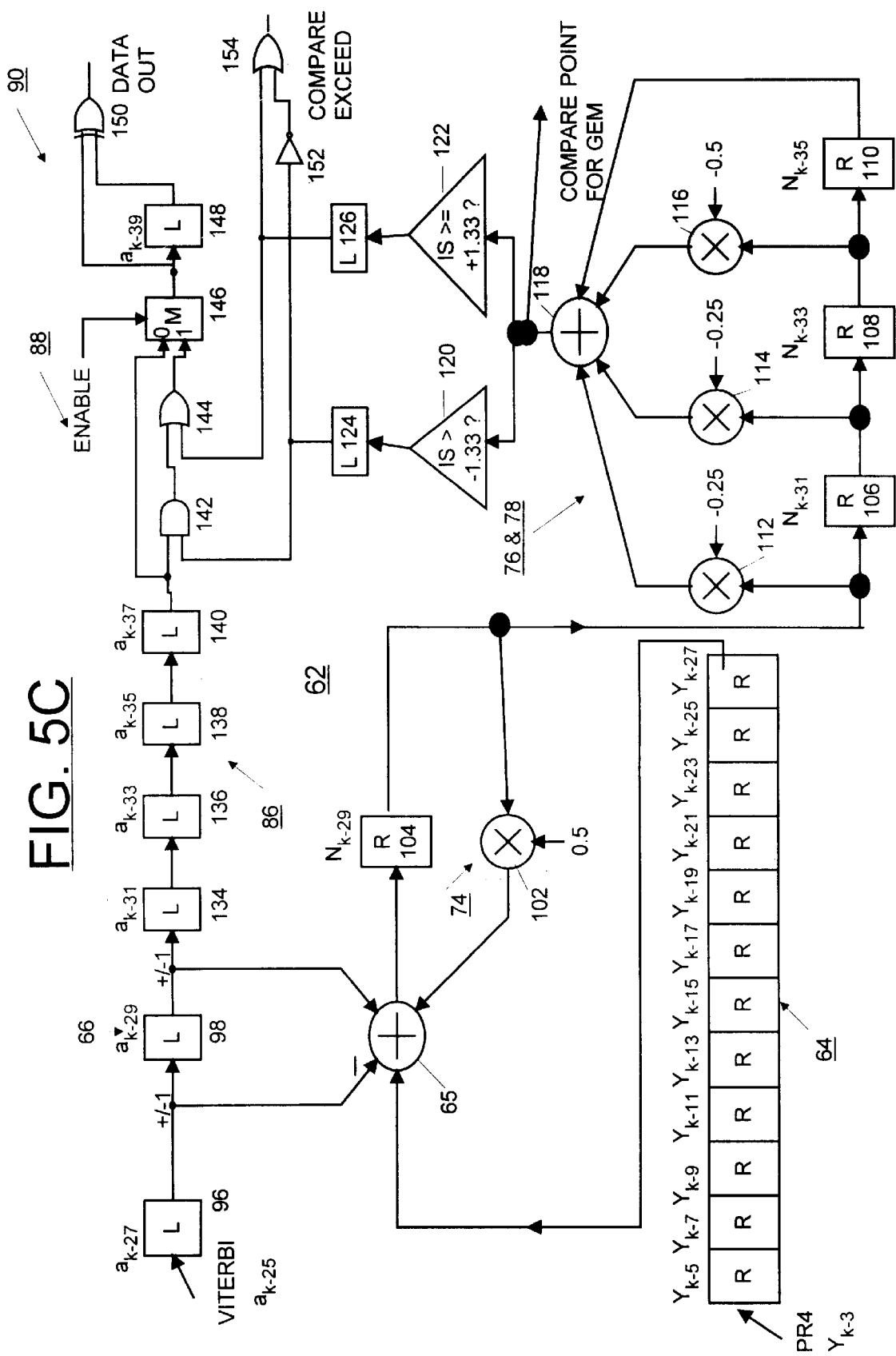

FIGS. 5A, 5B, and 5C illustrate the construction of the post processor detector 62 together with the Viterbi detector 60 which is shown in FIGS. 5A and 5B. As shown in FIG. 5A, the PR4 signal represented by $Y_{K-3}$ and $Y_{K-2}$ is applied to the PR4 Viterbi detector 60 and the output of the PR4 Viterbi detector 60 in FIG. 5B, is represented by $a_{K-25}$. The PR4 Viterbi detector 60 is a conventional PR4 Viterbi detector without an embedded $1-D^2$ postcoder.

Referring to FIG. 5C, the post processor detector 62 receives the PR4 signal represented by $Y_{K-3}$ applied to the first matching delay 64. The matching delay 64 includes a plurality of registers R respectively labeled $Y_{K-5}$, $Y_{K-7}$, $Y_{K-9}$, $Y_{K-11}$, $Y_{K-13}$, $Y_{K-15}$, $Y_{K-17}$, $Y_{K-19}$, $Y_{K-21}$, $Y_{K-23}$, $Y_{K-25}$, and $Y_{K-27}$ for matching the delay of the PR4 Viterbi detector 60. The post processor detector 62 receives the output of the PR4 Viterbi detector 60 represented by $a_{K-25}$ applied to a first latch 96 labeled $a_{K-27}$ connected to a second latch 98 labeled $a_{K-29}$ providing the two bit delay function 66. The PR4 Viterbi output signal and two bit delayed output of latch 98 ($a_{K-27} - a_{K-29}$) are applied to the adder 65 and subtracted from the delayed PR4 output signal of the matching delay 64. The function of the adder 65 is represented by $Y_{K-27} - (a_{K-27} - a_{K-29})$. The output of the adder 65 is applied to the bleaching filter 74 defined by a multiply 102 shown with a factor of 0.5, with $\alpha$ set equal to 0.5 and a register 104 labeled $N_{K-29}$. A combined matched filter 76 and error event filter 78 is defined by a plurality of registers 106, 108, and 110 labeled $N_{K-31}$, $N_{K-33}$, and $N_{K-35}$, a plurality of multipliers 112, 114, and 116 respectively, shown with a factor of −0.25, −0.25 and −0.5 applied to an adder 118. The output of adder 118 is labeled as a compare point for generalized error measurement (GEM) function (not shown). A pair of compare functions 120 and 122 coupled to respective latches 124 and 126 compare the filtered signal output of the combined matched filter 76 and error event filter 78 with a predetermined values, −1.33 and +1.33, as shown.

The second matching delay 86 is formed by a plurality of series latches 134, 136, 138, 140 labeled $a_{K-31}$, $a_{K-33}$, $a_{K-35}$, and $a_{K-37}$. The delayed Viterbi output is corrected responsive to the filtered signal output of the combined matched filter 76 and error event filter 78 utilizing the data stream modify function 88 defined by a series connected AND gate 142 and an OR gate 144 coupled to a multiplex M 146. The delayed Viterbi output is applied to AND gate 142 with a second input of gate 142 connected to latch 124 and an inverter 152. The output of inverter 152 is applied to an OR gate 154. The output of AND gate 142 is applied to the OR gate 144 with a second input of gate 144 connected to latch 126 and the OR gate 154. The output of OR gate 154 is labeled COMPARE EXCEED. An enable input of multiplex M 146 is set for selecting the corrected output of the data stream modify function 88. The postcoder 90 including a latch 148 labeled $a_{K-39}$, and an exclusive-or 150, provides the postcoded decisions indicated at a line labeled DATA OUT.

FIG. 6 illustrates the serial PR4 signal represented by $Y_K$ applied to a pair or dual interleaved detectors 60 and 62, a pair of clock splitters 160 and 162 coupled by a latch 164. A serial data output indicated at a line SERIAL DATA is provided by a first multiplexer 166 coupled to the data output (D) of both of the detectors 60 and 62. A serial margin output indicated at a line SERIAL MARGIN is provided by a second multiplexer 168 coupled to the margin output (M) of both of the detectors 60 and 62.

While the present invention has been described with reference to the details of the embodiments of the invention shown in the drawing, these details are not intended to limit the scope of the invention as claimed in the appended claims.

What is claimed is:

1. A method for data detection for a partial-response maximum-likelihood (PRML) data detection channel in a direct access storage device, said method comprising the steps of:

receiving a class-IV partial response (PR4) signal;

applying the received PR4 signal to a PR4 Viterbi detector to provide a PR4 Viterbi output;

applying the received PR4 signal to a first matching delay circuit to provide a delayed PR4 signal;

subtracting said PR4 Viterbi output from said delayed PR4 signal to provide a resulting signal;

applying the resulting signal to a first filter having a frequency response of $1/(1-\alpha D^2)$ to provide a filtered signal;

applying the filtered signal to a second filter to provide a second filtered output;

applying said PR4 Viterbi output to a second matching delay circuit to provide a delayed PR4 Viterbi output signal; and correcting said delayed PR4 Viterbi output responsive to said second filtered output signal.

2. A method for data detection for a partial-response maximum-likelihood (PRML) data detection channel in a direct access storage device as recited in claim 1 wherein the step of applying the received PR4 signal to a first matching delay circuit to provide a delayed PR4 signal includes the step of arranging said first matching delay circuit to provide a same time delay as said PR4 Viterbi detector.

3. A method for data detection for a partial-response maximum-likelihood (PRML) data detection channel in a direct access storage device as recited in claim 1 wherein the step of applying said PR4 Viterbi output to a second matching delay circuit to provide a delayed PR4 Viterbi output includes the step of arranging said second matching delay circuit to provide a same time delay as said first and second filters.

4. A method for data detection for a partial-response maximum-likelihood (PRML) data detection channel in a direct access storage device as recited in claim 1 wherein the step of applying the resulting signal to a first filter having a frequency response of $1/(1-\alpha D^2)$ to provide a filtered signal includes the step of applying the resulting signal to an infinite impulse response (IIR) first filter having said frequency response of $1/(1-\alpha D^2)$.

5. A method for data detection for a partial-response maximum-likelihood (PRML) data detection channel in a direct access storage device as recited in claim 1 wherein the step of applying the resulting signal to a first filter having a frequency response of $1/(1-\alpha D^2)$ to provide a filtered signal includes the step of providing said first filter having said frequency response of $1/(1-\alpha D^2)$, where $\alpha$ has a selected non-zero value less than 1.

6. A method for data detection for a partial-response maximum-likelihood (PRML) data detection channel in a direct access storage device as recited in claim 1 wherein the step of applying the filtered signal to said second filter to provide said second filtered output includes the steps of applying the filtered signal to a matched filter, and applying an output of said matched filter to at least one predetermined error event filter.

7. A method for data detection for a partial-response maximum-likelihood (PRML) data detection channel in a direct access storage device as recited in claim 6 includes the step of utilizing said at least one predetermined error event filter for identifying a dominant error event responsive to the applied filtered signal to said matched filter.

8. A method for data detection for a partial-response maximum-likelihood (PRML) data detection channel in a direct access storage device as recited in claim 7 includes the step of recording an error event type and a polarity of said error event type.

9. A method for data detection for a partial-response maximum-likelihood (PRML) data detection channel in a direct access storage device as recited in claim 8 includes the step of applying said recorded error event type and said polarity to a modify gating means for correcting said delayed PR4 Viterbi output responsive to said second filtered output signal.

10. Apparatus for data detection for a partial-response maximum-likelihood (PRML) data detection channel in a direct access storage device comprising:

an input providing a class-IV partial response (PR4) signal;

a PR4 Viterbi detector receiving the PR4 signal and providing a PR4 Viterbi output;

a first matching delay means for receiving the PR4 signal and for providing a delayed PR4 signal;

adder means for subtracting said PR4 Viterbi output from said delayed PR4 signal and for providing a resulting signal;

a first filter having a frequency response of $1/(1-\alpha D^2)$ receiving said resulting signal and providing a filtered signal;

a second filter receiving said filtered signal and providing a second filtered output signal;

a second matching delay means for receiving said PR4 Viterbi output and providing a delayed PR4 Viterbi output; and correcting means for correcting said delayed PR4 Viterbi output responsive to said second filtered output signal.

11. Apparatus for data detection for a partial-response maximum-likelihood (PRML) data detection channel in a direct access storage device as recited in claim 10 wherein said first filter is an infinite impulse response (IIR) first filter having said frequency response of $1/(1-\alpha D^2)$, where $\alpha$ has a selected non-zero value less than 1.

12. Apparatus for data detection for a partial-response maximum-likelihood (PRML) data detection channel in a direct access storage device as recited in claim 10 wherein said second filter is a matched filter.

13. Apparatus for data detection for a partial-response maximum-likelihood (PRML) data detection channel in a direct access storage device as recited in claim 10 wherein said matched filter is coupled to at least one predetermined error event filter.

14. Apparatus for data detection for a partial-response maximum-likelihood (PRML) data detection channel in a direct access storage device as recited in claim 13 further includes means for identifying a maximum magnitude signal over a predefined time period of all said at least one predetermined error event filter and for recording an event type and polarity.

15. Apparatus for data detection for a partial-response maximum-likelihood (PRML) data detection channel in a direct access storage device as recited in claim 14 wherein said recorded event type and polarity is applied to said correcting means.

16. Apparatus for data detection for a partial-response maximum-likelihood (PRML) data detection channel in a direct access storage device as recited in claim 10 includes dual interleaved detectors.

17. Apparatus for data detection for a partial-response maximum-likelihood (PRML) data detection channel in a direct access storage device as recited in claim 16 wherein said input providing a class-IV partial response (PR4) signal includes a serial input signal and said corrected delayed Viterbi output is a serial output signal, and each said dual interleaved clocked at half bit rate.

18. A method for data detection for a partial-response maximum-likelihood (PRML) data detection channel in a direct access storage device, said method comprising the steps of:

receiving a class-IV partial response (PR4) signal;

applying the received PR4 signal to a PR4 Viterbi detector to provide a PR4 Viterbi output;

applying the received PR4 signal to a first matching delay circuit to provide a delayed PR4 signal;

subtracting said PR4 Viterbi output from said delayed PR4 signal to provide a resulting signal;

applying the resulting signal to a first infinite impulse response (IIR) filter having a frequency response of $1/(1-\alpha D^2)$ to provide a filtered signal;

applying the filtered signal to a second matched filter for identifying a dominant error event;

applying said PR4 Viterbi output to a second matching delay circuit to provide a delayed PR4 Viterbi output signal; and correcting said delayed PR4 Viterbi output responsive to an identified dominant error event by said second matched filter.

19. Apparatus for data detection for a partial-response maximum-likelihood (PRML) data detection channel in a direct access storage device comprising:

an input providing a class-IV partial response (PR4) signal;

a PR4 Viterbi detector receiving the PR4 signal and providing a PR4 Viterbi output;

a first matching delay means for receiving the PR4 signal and for providing a delayed PR4 signal;

adder means for subtracting said PR4 Viterbi output from said delayed PR4 signal and for providing a resulting signal;

a filter having a frequency response of $$\frac{\sum_{i=0}^{\infty} B_i D^{2i}}{\sum_{i=0}^{\infty} \alpha_i D^{2i}}$$

receiving said resulting signal and providing a filtered signal;

said filter combined with an error event filter providing an error output signal;

a second matching delay means for receiving said PR4 Viterbi output and providing a delayed PR4 Viterbi output; and correcting means for correcting said delayed PR4 Viterbi output responsive to said error output signal.

20. Apparatus for data detection for a partial-response maximum-likelihood (PRML) data detection channel in a direct access storage device as recited in claim 19 includes dual interleaved detectors.

* * * * *